United States Patent
Azatyan et al.

(10) Patent No.: US 11,975,807 B1
(45) Date of Patent: May 7, 2024

(54) AUTONOMOUS RESCUE VEHICLE

(71) Applicant: Government of the United States, as represented by the Secretary of the Air Force, Wright-Patterson AFB, OH (US)

(72) Inventors: Hayk Azatyan, Springfield, OH (US); William Erwin, Oakwood, OH (US); Anthony Ligouri, Bellbrook, OH (US); Travis Rennich, Kettering, OH (US); David Shald, Dayton, OH (US); Adam Warren, Fairborn, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 166 days.

(21) Appl. No.: 17/479,167

(22) Filed: Sep. 20, 2021

Related U.S. Application Data (60) Provisional application No. 63/117,610, filed on Nov. 24, 2020.

(51) Int. Cl.
  B63B 79/40 (2020.01)
  B63B 35/00 (2020.01)
  (Continued)

(52) U.S. Cl.
  CPC .............. B63B 79/40 (2020.01); B63B 35/00 (2013.01); B63C 9/02 (2013.01); G05D 1/0206 (2013.01);
  (Continued)

(58) Field of Classification Search
  CPC ......... B63B 35/00; B63B 79/00; B63B 79/40; B63B 2035/005; B63B 2035/007;
  (Continued)

(56) References Cited

U.S. PATENT DOCUMENTS

| | | |
|---|---|---|
| 3,054,124 A | 9/1962 | Silverstone |
| 3,268,925 A | 8/1966 | Serra |

(Continued)

FOREIGN PATENT DOCUMENTS

| | | |
|---|---|---|
| WO | 2014200136 A1 | 12/2014 |

OTHER PUBLICATIONS

David Hambling, The Military's Weapon-Carrying, Terrorist-Spotting Autonomous Jet Ski, Popular Mechanics, Nov. 24, 2010, published on the internet at https://www.popularmechanics.com/military/a6273/the-militarys-autonomous-jet-ski/.

(Continued)

*Primary Examiner* — Lars A Olson
(74) *Attorney, Agent, or Firm* — AFMCLO/JAZ; Jeffrey V. Bamber (57) ABSTRACT

An aquatic rescue vehicle formed by adding directional and speed controls to a watercraft along with an autonomous control system to guide the vehicle to specified waypoints is disclosed. The rescue vehicle includes search devices such as a radio direction finder (RDF) and an infrared sensor (or camera) to be used to narrow the search for an isolated person (IP). The rescue vehicle may be discharged from a larger watercraft or an airplane and autonomously set out on its rescue mission. The vehicle may first navigate to a designated waypoint near an IP, and then use signals gathered from the RDF and infrared sensor to finally locate, assist, and retrieve the IP. The vehicle also includes a self-righting mechanism so that the vehicle can complete its mission even under the most adverse conditions.

14 Claims, 8 Drawing Sheets

(51) Int. Cl.
  *B63C 9/02* (2006.01)
  *G05D 1/00* (2006.01)
  *G05D 1/02* (2020.01)

(52) U.S. Cl.
  CPC ... *B63B 2035/005* (2013.01); *B63B 2035/007* (2013.01); *B63C 2009/023* (2013.01)

(58) Field of Classification Search
  CPC ....... B63C 9/00; B63C 9/02; B63C 2009/023; G05D 1/02; G05D 1/0206
  USPC ......................................................... 114/55.5
  See application file for complete search history.

(56) References Cited

U.S. PATENT DOCUMENTS

| | | | |
|---|---|---|---|
| 3,734,047 A | 5/1973 | Burton | |
| 4,579,536 A | 4/1986 | Cameron | |
| 4,622,557 A | 11/1986 | Westerfield | |
| 4,683,900 A | 8/1987 | Carmichael | |
| 5,056,453 A | 10/1991 | Wright | |
| 5,111,401 A | 5/1992 | Everett, Jr. et al. | |
| 5,167,550 A | 12/1992 | Nielsen | |
| 5,597,335 A | 1/1997 | Woodland | |
| 5,662,063 A | 9/1997 | Seijas | |
| 5,713,293 A | 2/1998 | Shiffler et al. | |
| 5,988,099 A | 11/1999 | Ferrell | |
| 6,269,763 B1 | 8/2001 | Woodland | |
| 7,836,964 B2 | 11/2010 | Groonwald | |
| 8,123,577 B2 * | 2/2012 | Riggs | B63B 35/00 440/6 |
| 8,150,621 B1 | 4/2012 | Phillips et al. | |
| 8,701,580 B2 | 4/2014 | Feteih | |
| 8,882,555 B2 * | 11/2014 | Mulligan | B63B 35/00 441/80 |
| 9,394,041 B2 | 7/2016 | Hilbert et al. | |
| 9,815,533 B2 | 11/2017 | Wood | |
| 10,373,469 B2 | 8/2019 | Fernandez et al. | |
| 10,633,072 B1 | 4/2020 | Arbuckle et al. | |
| 10,640,190 B1 | 5/2020 | Gonring | |

OTHER PUBLICATIONS

U.S. Appl. No. 17/479,108, filed Sep. 20, 2021, Azatyan, et al.
Jensen, Capt William, "Target Support in a Resource Constrained Environment", Ship Deployable Seaborne Target (SDST), which is a remote controlled variant of a Bombardier SEA DOO GTX personal watercraft that is used for towing targets, pp. 1 and 10, published Oct. 27, 2011, available on the internet at https://ndiastorage.blob.core.usgovcloudapi.net/ndia/2011/targets/ThursdayJenson.pdf.
Wikipedia, "Personal Watercraft", which discloses personal watercraft that have been in use before the filing date of the present patent application that contain one or more seats, available on the internet at https://en.wikipedia.org/wiki/Personal_watercraft, as of Jan. 1, 2024.
Jan. 8, 2024 Office Action in co-pending U.S. Appl. No. 17/479,108.

* cited by examiner

AUTONOMOUS RESCUE VEHICLE

Pursuant to 37 C.F.R. § 1.78(a)(4), this application claims the benefit of and priority to prior filed Provisional Application Ser. No. 63/117,610 filed Nov. 24, 2020, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to autonomous rescue vehicles and, more particularly, to autonomous rescue vehicles for water rescues.

BACKGROUND OF THE INVENTION

A person may become isolated (isolated person or "IP") in various locations (such as on a large body of water) and need to be rescued. Empirical evidence has shown that persons in need of rescue can die from various causes (exposure, dehydration, hypothermia, predators), hence the most important factor weighing in their survival is the time of rescue. The faster they can be rescued, the more likely they will survive.

Moreover, certain conditions create a dangerous or even impossible rescue situation for both the rescuer and the IP in need of help. Such difficult conditions include a pilot being downed near enemy combatants, or perhaps a surfer being swept out to sea by conditions beyond what a lifeguard could physically handle. Waiting for conditions to become more favorable takes time, and time is not something that the IP can readily spare.

A watercraft is needed that can be sent to retrieve the IP using autonomous navigation and IP finding devices. The rescue crew is thereby spared from danger, and the IP being rescued might also be extracted in a faster, more efficient, and more clandestine way (i.e., if secrecy is needed).

In such cases, it may be desirable to use a watercraft in an autonomous manner. When a watercraft is used in an autonomous manner, it cannot risk being flipped over without a means to automatically right itself again. Without a self-righting mechanism, the mission of the autonomous vehicle, and the safety of the person being rescued, would be put into jeopardy. In some cases, it may be desirable to deploy the watercraft by air drop, in which case the self-righting mechanism must be able to survive an air drop.

The search for improved autonomous rescue vehicles has continued. In particular a need exists for a robust vehicle that can proceed quickly and autonomously into adverse conditions in order to locate, assist, and retrieve a person in need of rescue. A need also exists for such a rescue vehicle to be self-righting if it flips over. In addition, it is desirable to develop an autonomous rescue vehicle that is practical and can be built on a commercially available watercraft using off-the-shelf components.

SUMMARY OF THE INVENTION

While the invention will be described in connection with certain embodiments, it will be understood that the invention is not limited to these embodiments. To the contrary, this invention includes all alternatives, modifications, and equivalents as may be included within the spirit and scope of the present invention.

An aquatic rescue vehicle formed by adding directional and speed controls to a watercraft along with an autonomous control system to guide the vehicle to specified waypoints is disclosed. The rescue vehicle includes search devices such as a radio direction finder (RDF) and an infrared sensor (or camera) to be used to narrow the search for an isolated person (IP). The rescue vehicle may be discharged from a larger watercraft or an airplane and autonomously set out on its rescue mission. The vehicle may first navigate to a designated waypoint near an IP, and then use signals gathered from the RDF and infrared sensor to finally locate, assist, and retrieve the IP. The vehicle also includes a self-righting mechanism so that the vehicle can complete its mission even under the most adverse conditions.

Methods of rescuing a person on a body of water with an aquatic rescue vehicle are also disclosed.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The present invention is directed to autonomous rescue vehicles for water rescues that can locate, assist, and retrieve a person in need of rescue. The rescue vehicle may be provided with a self-righting mechanism if the vehicle flips over. In addition, the autonomous rescue vehicle is practical and can be built on a commercially available watercraft using off-the-shelf components.

The autonomous rescue vehicle can be based on any suitable type of watercraft. Suitable types of watercraft include, but are not limited to: personal watercrafts (PWC's) such as JET SKI® or WAVE RUNNER® type watercrafts, military craft and other rescue operation craft including but not limited to those with a rigid hull and inflatable sides.

Figure 1:
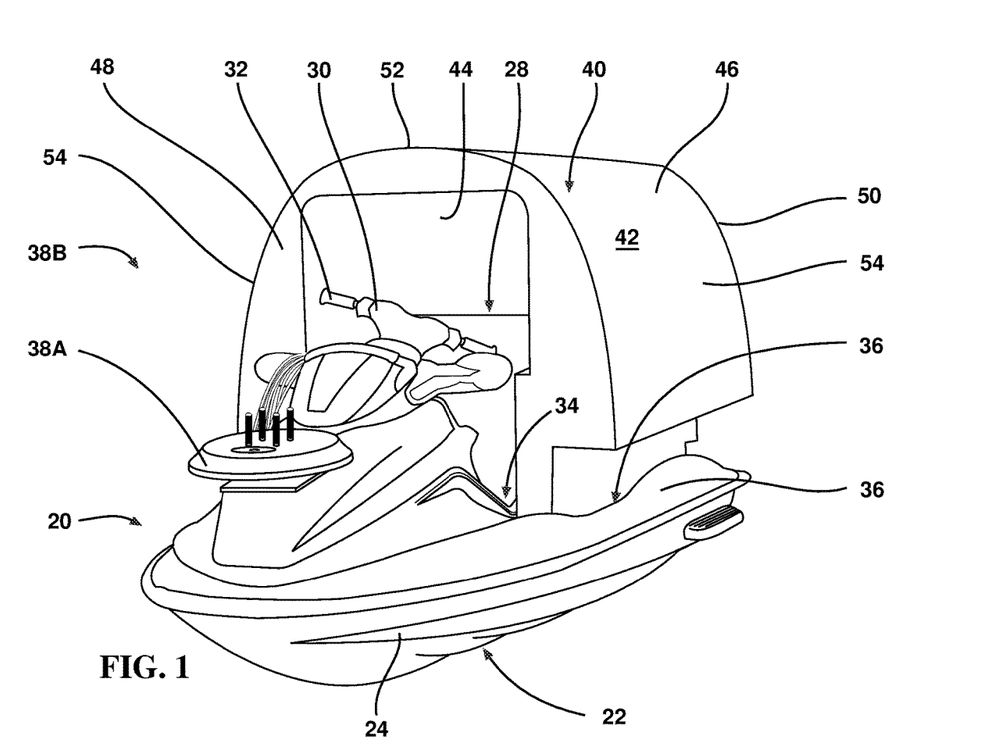
FIG. 1 is a perspective view of a watercraft having one embodiment of a detachable buoyant component joined thereto for making a watercraft self-righting.

FIG. 1 shows one non-limiting embodiment of watercraft 20 in the form of a JET SKI® or WAVE RUNNER® type personal watercraft. The personal watercraft 20 comprises a vessel body 22 that includes a hull 24 and a deck 26. The watercraft 20 has a bow, a stern, and an imaginary longitudinal centerline running between its bow and stern. A seat 28 is provided for the operator. The vessel body 22 has a motor disposed between the hull 24 and the deck 26. The watercraft 20 can comprise a plurality of seats 28 in other embodiments. A propulsion mechanism/system is operatively connected to the motor. It may be desirable for the personal watercraft to have jet-drive propulsion to avoid possible propeller contact with the person to be rescued if the watercraft is used for rescue purposes. (The motor and propulsion mechanism are conventional and not shown.) A steering mechanism 30, which may be in the form of handlebars or a steering wheel is joined to the vessel body. A throttle 32 may be provided on the steering mechanism 30. The watercraft 20 may comprise foot wells 34 on each side of the seat 28 for the rider's feet. A pair of generally upwardly extending walls known as gun wales or gunnels 36 are located on either side of the watercraft 20.

The embodiment of the personal watercraft 20 shown in FIG. 1 may be converted into a semi-autonomous or autonomous aquatic rescue vehicle. Such a rescue vehicle can be operated in an unmanned manner as if one or more persons were aboard. It should be understood, however, that the personal watercraft 20 need not be so converted for the detachable buoyant component 40 to serve its purpose. The detachable component 40 can be used on a stock personal watercraft. The term "semi-autonomous", as used herein, refers to a vehicle that has full or partial autonomous capability with an ability to be manipulated or directly controlled by a human operator. The term "autonomous", as used herein, refers to a vehicle that can be provided with a mission and can carry out that mission without control by a human operator. The semi-autonomous or autonomous watercraft may be optionally manually piloted once a person (such as the person who is rescued) climbs aboard the watercraft 20. The phrase "with at least partially autonomous control", as used herein, is intended to include systems which have semi-autonomous control, or fully autonomous control, either of which may include the ability to be optionally controlled by a person piloting the vehicle.

Personal watercraft suitable for conversion into an autonomous aquatic rescue vehicles include, but are not limited to the SEA DOO® GTI™ and the YAMAHA® FXC® personal watercraft. The personal watercraft may be converted into an autonomous rescue vehicle by adding mechanical and/or electronic controls to the steering mechanism 30 and throttle 32. A directional control mechanism may be joined to the steering mechanism 30. For example, a servo mechanism and four bar linkage can be joined to the steering mechanism 30 to provide mechanical steering control. The personal watercraft may be modified to provide a speed control such as a throttle control which is in operative communication with the motor. For example, similar servo mechanisms and linkages can be added to control the throttle 32.

Alternatively, instead of mechanical bar linkages, the steering mechanism 30 and/or throttle 32 can be controlled using linear actuators to provide the personal watercraft with "fly-by-wire" control. Fly-by-wire control correlates the operator movement with the movement of controls without direct mechanical linkage. For example, for steering, to provide steer-by-wire control, an electrical signal can be sent to control a servo motor that in turn moves the direction of the jet nozzle. The speed of the watercraft can controlled in a similar manner.

The speed control may, thus, be said to be in communication with the propulsion mechanism, and the directional control may be said to be in communication with the steering mechanism. The phrase "in communication with", as used herein, includes mechanical linkages, fly-by-wire (steer-by-wire), or other electrical, or electronic mechanisms that allow the speed control and the directional control mechanisms to control the propulsion and steering mechanisms, respectively. The autonomous control system may be said to be in "operative communication with" the directional and speed controls. The phrase "in operative communication with" means not only that the autonomous control system is in communication with the directional and speed controls, but that it is capable of operating the same.

The mechanical or electronic controls may be controlled with an autonomous (or autopilot) control system that is in operative communication with the mechanical or electronic directional and speed controls. The autonomous control system can comprise any suitable commercially available system. For example, an autopilot guidance system such as the PIXHAWK™ guidance system available from https://pixhawk.org, or other guidance systems, can be used. Alternatively, the technology described in the U.S. Navy's U.S. Pat. No. 5,713,293, Shiffler, et al. can be used. However, it is desirable that such alternative technology be applied to an existing personal watercraft without altering the basic configuration of the watercraft, and also retaining the seat so a person rescued using the watercraft can ride on the watercraft and optionally pilot the same to safety.

If the watercraft 20 will be used for search and rescue operations, a GPS device and at least one sensing system or search device may also be joined to the watercraft. For example, as shown in FIG. 1, the watercraft 20 has search devices joined thereto including a radio direction finder (RDF) 38A to receive signals from the person to be rescued and an infrared sensor (or camera) 38B to be used to narrow the search for a person in need of rescue. The watercraft 20 may incorporate any of the technology described in expired U.S. Pat. No. 5,597,335, Woodland and/or in U.S. Pat. No. 8,150,621 B1, Phillips, et al. (the latter being assigned to the U.S. Navy).

The watercraft 20 has a detachable, non-inflatable buoyant component (or "detachable component") 40 joined thereto for making a watercraft self-righting. The detachable component 40 may, in addition to being detachable also be attachable, and after removal, be reattachable. The term "detachable", as used herein, means removable by hand without the use of tools and without breaking any portions of the components that are joined together. The terms "non-inflated" and "non-inflatable", as used herein, refer to structures that have a defined fixed configuration as opposed to structures like inflatable rafts that have an initial collapsed configuration and are filled with air or other gas to form the same into an expanded structure. The detachable component 40 can make the watercraft 20 automatically self-righting without any action on the part of a human. Thus, with the detachable component, a person is not required to climb onto a watercraft that has been flipped and to use their body weight to help right the watercraft.

The detachable component 40 comprises a non-inflatable buoyant structure (member, or element) 42 and at least one connecting mechanism joined to the buoyant structure for detachably connecting the buoyant structure to a watercraft. It should be understood that some portions of the detachable buoyant component 40, such as the connecting mechanism, need not be comprised of buoyant material. The detachable component 40 and the elements comprising the same can be made in a variety of sizes and shapes, depending upon, among other things, the underlying watercraft to which it will be attached. In the embodiment shown in FIGS. 1 and 2, the buoyant structure 42 has an interior surface 44, an exterior surface 46, a front portion 48, and a rear (or back) portion 50. The buoyant structure 40 in this embodiment comprises a top portion 52 that is disposed over the seat 28 of the personal watercraft and sides 54 extending downwardly from the top portion 52 at an angle to free distal end portions 56 that are adjacent to the deck 26 of the personal watercraft. It may be desirable for the exterior surface to have a convexly curved or rounded (e.g., barrel-like) cross-sectional configuration to assist in the self-righting process.

Figure 3:
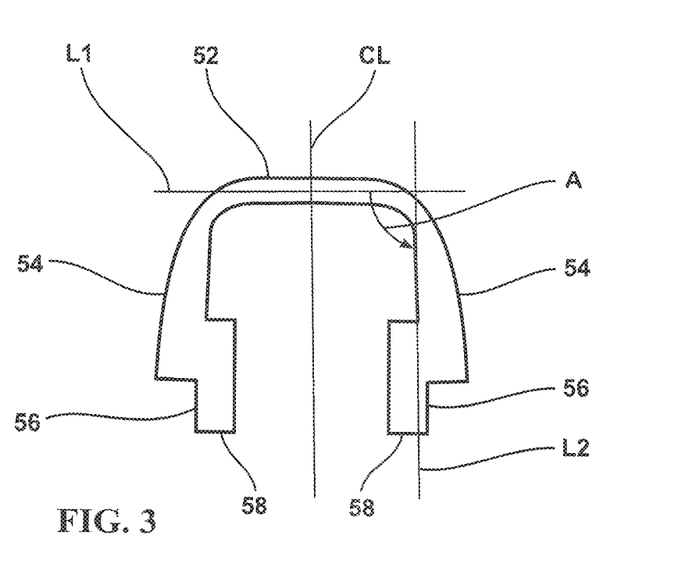
FIG. 3 is a schematic front view of the buoyant component shown in FIGS. 1 and 2.

The buoyant structure 42 can be comprised of one or more pieces. In the embodiment shown, the buoyant structure 42 comprises a one piece component in which the sides 54 are integrally formed with the top portion 52. In such a case, there need not be a sharp demarcation or angle where the top portion 52 ends and the sides 54 begin. The top portion 52 may form a gradual transition with the sides 54. FIG. 3 shows that the angle A between the top portion 52 and the sides 54 may be determined when viewing the buoyant structure 42 from the end or in cross-section by first drawing a line L1 through the midpoint between the interior and exterior surfaces of the top portion 52 at the longitudinal centerline CL of the buoyant structure 42 and a line L2 that passes through the distal end 56 of the sides 54 and lies between the interior and exterior surfaces of the sides 54. The angle A formed by the intersection of these lines L1 and L2 defines the angle between the top portion 52 and the sides 54. Angle A can be any suitable angle that allows the buoyant structure 42 to perform its self-righting task described herein. The sides 54 may, for example, extend at an angle of between about 75 degrees and about 100 degrees from the top portion 52 of the buoyant structure 42. In some cases, the sides 54 of the buoyant structure 42 may extend at an angle of about 90 degrees from the top portion 52 of the buoyant structure 42.

Figure 2:
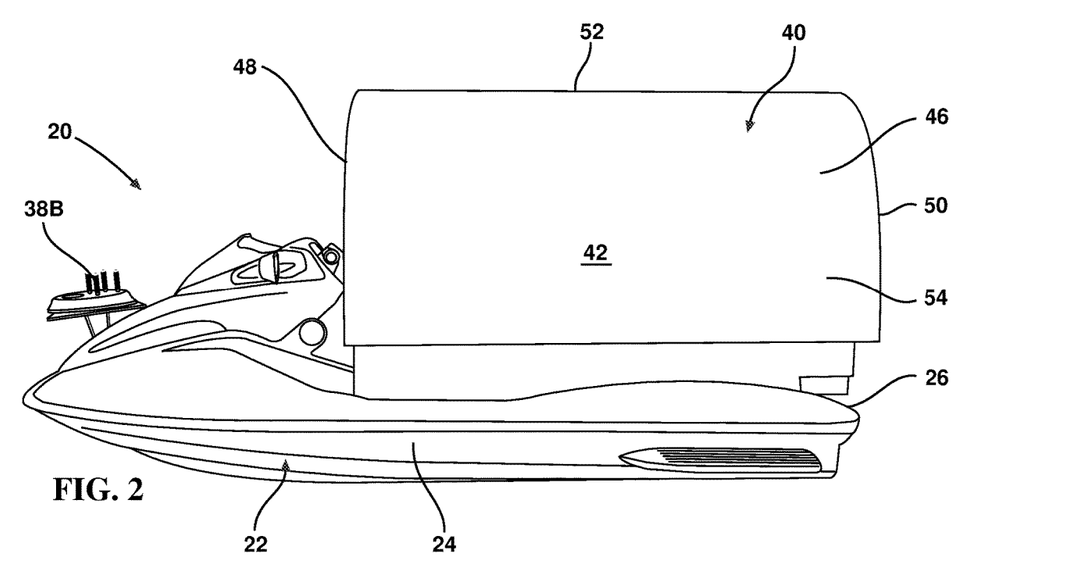
FIG. 2 is a side view of the watercraft and buoyant component shown in FIG. 1.
Figure 6:
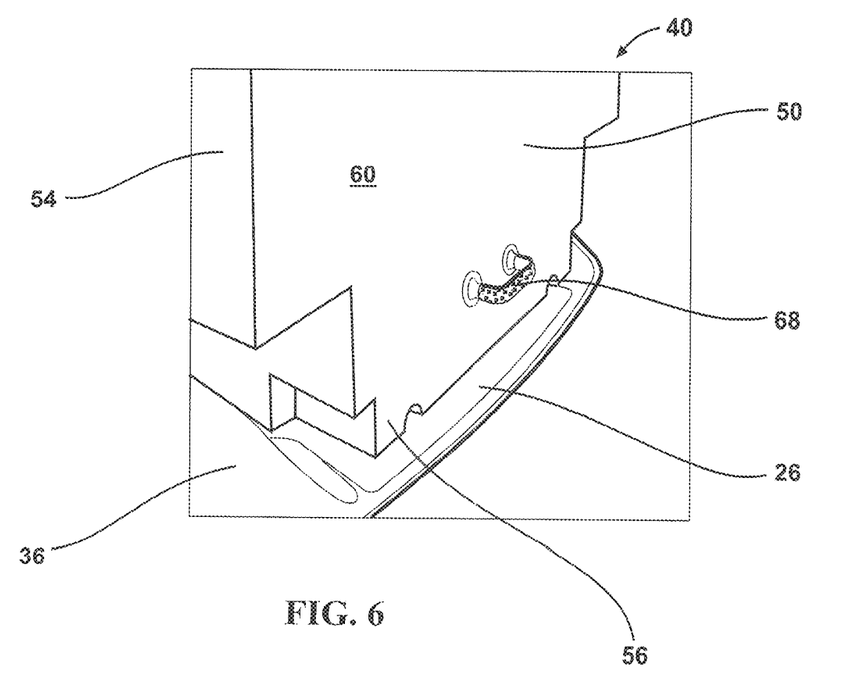
FIG. 6 is perspective view of one end of the detachable buoyant structure which has a handle thereon for removing the same from the watercraft.

In the embodiment shown in FIGS. 1-3, the buoyant structure 42 has a tunnel-shaped configuration with a generally U-shaped cross-sectional configuration. FIG. 2 shows that the top portion 52 of the buoyant structure 42 may be provided with an optional recess for a parachute when the watercraft is air dropped. The front portion 48 of the buoyant structure 42 may be open to accommodate the steering handlebars and throttle control of the personal watercraft. The sides 54 of the buoyant structure 42 comprise side walls that extend from the front portion 48 to the rear portion 50 of the buoyant structure 42. This may be useful to prevent water from entering the space between the top portion 52 and the deck 26 of the watercraft 20 when the watercraft is in the process of self-righting. The rear portion 50 of the buoyant tunnel-shaped structure can be closed with a back end wall 60 as shown in FIG. 6. In this embodiment, the general shape of the detachable component may be considered to be that of a rounded canopy or dome with a barrel-shaped exterior surface at the top thereof. This allows the upside-down craft to roll to an upright configuration along the curved shape of the buoyant structure 42.

The buoyant structure 42 can be made of any suitable material(s) that forms a non-inflatable structure. The buoyant structure 42 may comprise at least one of: (a) a buoyant material and (b) materials that are arranged into a buoyant configuration. In the first case, the buoyant structure 42 may be made from a lightweight yet durable material. The material used to construct the buoyant structure 42 can be any buoyant material, such as a rigid foam such as polystyrene. The foam can be further coated with epoxy or other coatings to make its outer surface more durable and usable in field and rescue situations and/or for other purposes. For instance, it may be desirable to coat and/or apply another material to the foam so that connectors can be joined to the buoyant structure 42.

In the second case mentioned above, the buoyant structure 42 can be made of materials that are arranged into a buoyant configuration. For example, the buoyant structure 42 shown in FIGS. 1-3 may be formed into a dome-shaped structure made from rigid hard plastic that is configured to be hollow inside (i.e., an air cavity) in order to be sufficiently buoyant. The term "rigid", as used herein with respect to the buoyant structure, refers to the property that the material comprising the structure has a fixed form and does not collapse and/or expand as do materials that form inflatable structures. In some embodiments, additional supplies (e.g., food and/or water), safety equipment, medical supplies, or rescue equipment could be stored inside this air cavity space as long as the center of buoyancy (COB) is not adversely affected.

In some cases, the buoyant structure 42 can provide room for a rider while the detachable buoyant component 40 is still attached to the personal watercraft. For instance, it may be desirable for the distance between the bottom 58 of the sides 54 and the inside surface of the top portion 52 be about five feet. Such a design might allow a rider to navigate back more safely in very rough seas—i.e., if the craft is up-ended while they are on it, the craft would self-right and the rider could continue onward to safety.

The self-righting detachable buoyant component 40 may be detachably joined to any suitable portion of a watercraft 20 in any suitable manner. In the embodiment shown in FIGS. 1-4, the free end portions 56 and the bottom surface 62 of the rear end wall 60 of the buoyant structure 42 are joined to the deck 26 of the watercraft 20 using connectors designated generally by reference number 70. The connectors (or fasteners) 70 may comprise a specialized set of connectors. One objective of the connectors 70 is to allow a person in the water to quickly release and remove the detachable buoyant component 40 with one hand. A handle 68 can be provided on the detachable component 40 for this purpose. The handle 68 can be provided on any suitable portion of the body of the detachable component. As shown in FIG. 6, the handle 68 may be provided on the rear wall 60 of the buoyant structure 42.

In the embodiment shown in FIGS. 1-4, the connectors 70 comprise a first group of fastening components 72 that are joined to the watercraft 20 that mate with a second group of fastening components 74 that are joined to the buoyant structure 42. While there can be any suitable number of fastening components, in the embodiment shown, there are four pairs of mating fastening components.

The first group of fastening components 72 can be joined to any suitable part of the watercraft including but not limited to the deck 26 and/or the gun wales 36. In the embodiment shown, the first group of fastening components 72 are joined to the deck 26 of the watercraft 20. In this particular embodiment, the first group of fastening components 72 comprises two different types of fasteners 72A and 72B.

Figure 5A:
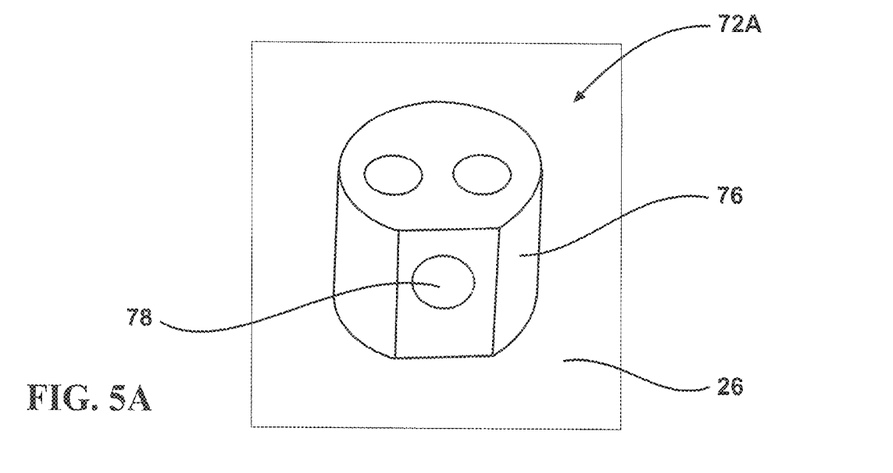
FIG. 5A is a perspective view of one of the connectors joined to the deck of the watercraft for connecting the buoyant component to the watercraft.

FIG. 5A shows one type of fastening component 72A that is joined to the portion of the deck 26 that comprises the foot wells 34. This fastening component 72A is in the form of a post 76 having a longitudinal axis extending outward perpendicularly from the surface of the deck 26. The fastening component 72A has a receiving hole (or bore) 78 bored through the post 76 perpendicular to the longitudinal axis of the post 76. The hole 78 is oriented so that it aligns parallel to the longitudinal centerline of the watercraft 20. One fastening component 72A of this type is joined to each foot well 34.

Figure 5B:
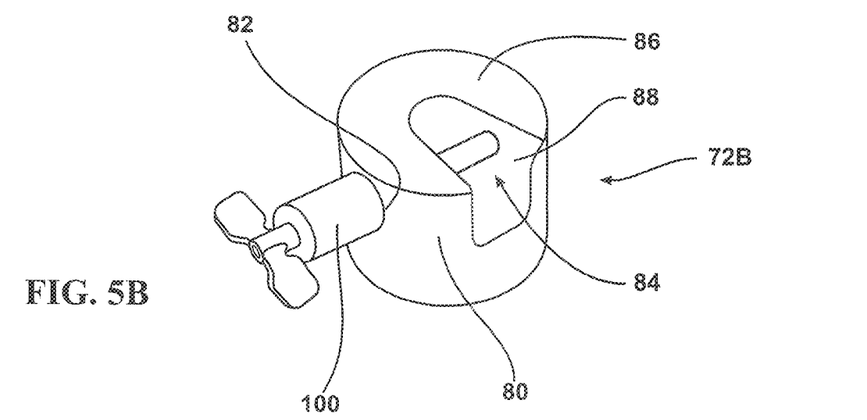
FIG. 5B is a perspective view of a connector joined to the rear portion of the deck of the watercraft for connecting the buoyant component to the watercraft.

FIG. 5B shows the other type of fastening component 72B in the first group of fastening components 72. This fastening component 72B is joined to the deck 26 at the rear of the watercraft 20. This fastening component 72B is also in the form of a post 80 having a longitudinal axis extending outward perpendicularly from the surface of the deck 26. The fastening component 72B also has a receiving hole (or bore) 82 bored through the post 80 perpendicular to the longitudinal axis of the post 80. However, the hole 82 is oriented so that it aligns perpendicular to the longitudinal centerline of the watercraft. In addition, this fastening component 72B has a generally U-shaped opening 84 in its top 86 that is configured to receive the post of a second fastening component, such as that shown in FIG. 5D. The U-shaped opening 84 is oriented so that the top 88 of the U-shape faces the rear of the watercraft.

Figure 4:
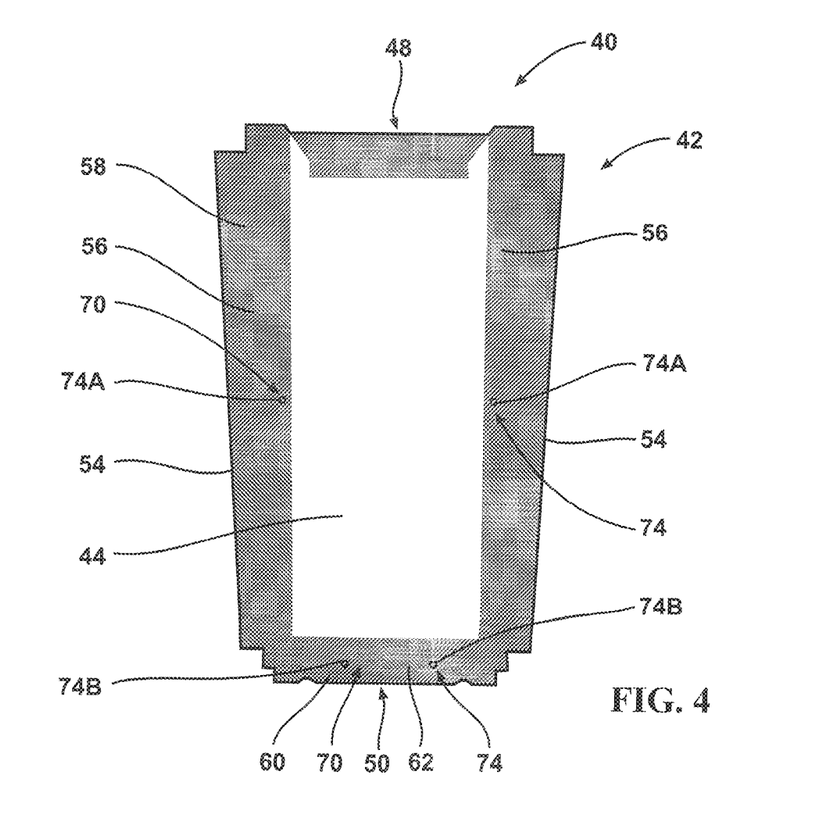
FIG. 4 is a perspective view of the bottom of the buoyant component shown in FIGS. 1 and 2.

The second group of fastening components 74 are joined to the buoyant structure 42 in the embodiment shown in FIGS. 1-4. FIG. 4 shows that two of the second group of fastening components 74A are provided on the bottom surface 58 of the free end portions 56 of the sides 54 adjacent to the front, or middle, of the buoyant structure 42. In addition, two other fastening components 74B are provided on the bottom surface 62 of the rear wall 60 of the buoyant structure 42.

Figure 5C:
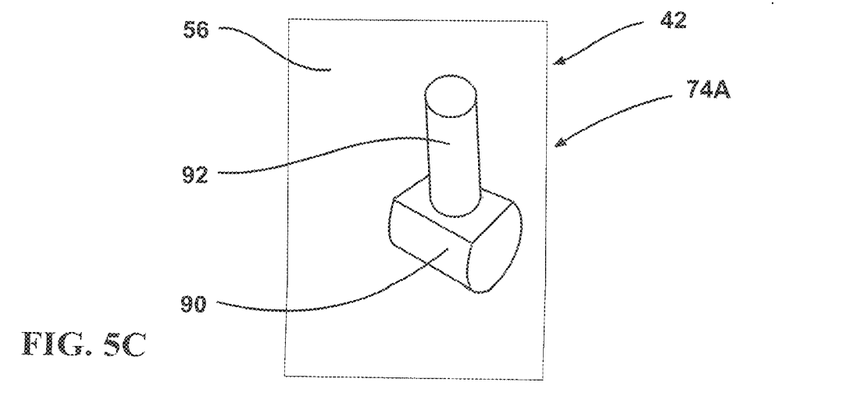
FIG. 5C is a perspective view of a connector that is joined to the bottom surface of the buoyant component for connecting the buoyant component to the watercraft.

FIG. 5C shows the first type of fastening component 74A in the second group of fastening components 74. This first type of fastening component 74A may be referred to herein as a "third fastening component" to further distinguish it from the first and second fastening components in the first group of fastening components. The third fastening components 74A are provided on the bottom surface 58 of the free end portions 56 of the sides 54 of the buoyant structure 42 adjacent the middle of the buoyant structure 42. In the embodiment shown, the third fastening components 74A are in the form of posts 90 extending outward perpendicularly from the surface of the buoyant structure 42. A pin 92 extends perpendicularly from the post 90. In the embodiment shown, each of the pins 92 are oriented to extend toward the front 48 of the buoyant structure 42. These pins 92 engage with the first fastening components 72A shown in FIG. 5A that are joined to the deck 26 of the watercraft 20. The third fasting components 74A are configured so that the middle of the buoyant structure 42 is constrained thereby from moving vertically, and horizontally from side to side, but not horizontally rearwardly. Thus, when the first and third fastening components 72A and 74A are joined together, the buoyant structure 42 is only capable of moving in the direction of the longitudinal centerline to the rear (or stern) of the watercraft 20.

Figure 5D:
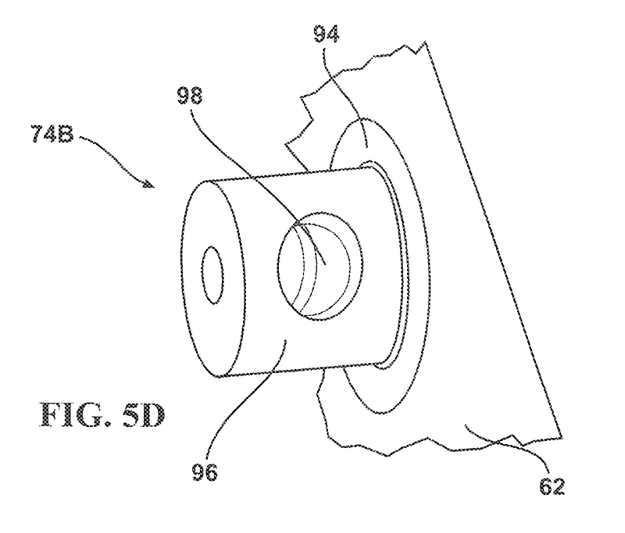
FIG. 5D is a perspective view of a connector joined to the rear portion of the buoyant component for connecting the buoyant component to the watercraft.

FIG. 5D shows the other type of fastening component 74B in the second group of fastening components 74. This second type of fastening component 74B may be referred to herein as a "fourth fastening component". These fourth fastening components 74B are provided on the bottom surface 62 of the back wall 60 of the buoyant structure 42. In the embodiment shown, the fourth fastening components 74B comprise a flange 94 and a post 96 extending outwardly perpendicularly from the flange 94. The post 96 has a receiving hole (or bore) 98 bored through the post 96 perpendicular to the longitudinal axis of the post 96. The hole 98 is oriented so that it aligns perpendicular to the longitudinal centerline of the watercraft. The fourth fastening component 74B shown in FIG. 5D will be inserted into the U-shaped opening 84 of the second fastening component 72B with the hole 98 bored therethrough aligned with the bore 82 through the second fastening component 72B. A quick release securing component will pass through both bore-through holes to constrain this pair of fastening components from moving in all directions. In one embodiment (as shown in FIG. 5B), the quick release securing components 100 can comprise Jergens Kwik-Lok® Quick-Release pins available from Jergens, Inc. of Cleveland, OH, U.S.A. The connector(s) on the rear wall 60 of the buoyant structure 42 are, thus, constrained from moving both horizontally and vertically.

The fastening components in the first and second groups of fastening components 72 and 74 can be made of any suitable material. In the embodiment shown, they are comprised of metal such as stainless steel. Ordinarily, it is difficult to securely attach a metal fixture to a foam material such as that comprising the buoyant structure 42 shown in the drawings. To solve this problem, the second group of fastening components 74 (and the handle 68) can be joined to the buoyant structure 42 by reinforcing the portion of the buoyant structure 42 to which these fixtures will be attached. For example, a polyurea coating manufactured by VersaFlex Incorporated of Kansas City, Kansas, U.S.A. can be applied to the foam in order to strengthen the same to permit attachment of these fixtures. In addition, any flanges on the fastening components can be reinforced by covering the flanges with fiberglass to adhere the same to the foam.

The buoyant component 40 can be removably joined to the deck 26 of the personal watercraft 20 by sliding so that first and third fastening components 72A and 74A are connected in the front portion of the buoyant component 40, and then pressing down on the rear 50 of the buoyant component so that the second and fourth fastening components 72B and 74B secure the rear portion of the buoyant component to the deck of the personal watercraft. Quick release securing components (i.e. locking pins or other such devices) 100 are used to secure the second and fourth fastening components 72B and 74B together on the bottom surface 62 of the back wall 60 of the buoyant structure 42. Once the quick release components 100 are removed, the detachable buoyant component 40 can be pulled off the personal watercraft 20 with one hand via the handle 68.

Figure 7A:
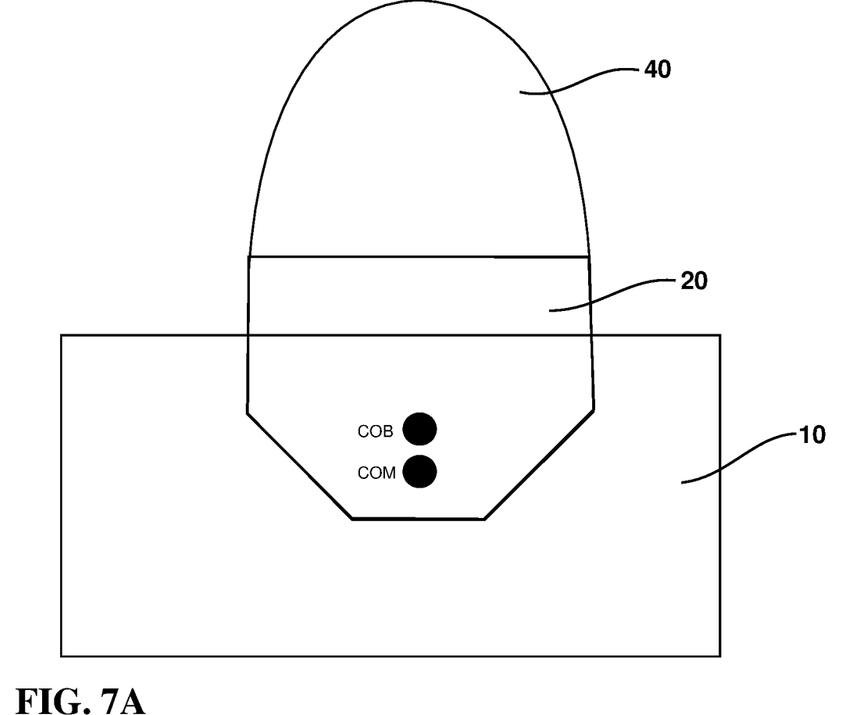
FIG. 7A is a schematic end view of a watercraft with the detachable buoyant structure.
Figure 7B:
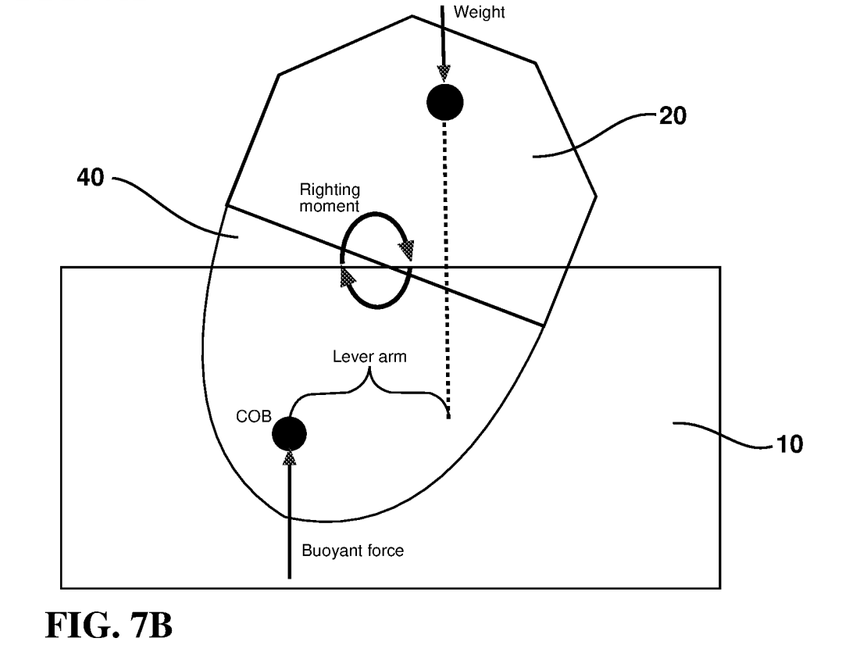
FIG. 7B is a schematic end view of the watercraft with the detachable buoyant structure that shows the self-righting capability of the detachable buoyant structure.

FIGS. 7A and 7B show that the self-righting detachable buoyant component configuration has been designed to change the center of buoyancy of a watercraft 20 and thereby make the watercraft 20 self-righting if it is ever flipped over from its normal upright configuration. The self-righting capability takes advantage of the fact that the center of mass (COM) of the personal watercraft 20 is very low as shown in FIG. 7A. FIG. 7B shows that the center of buoyancy (COB) of the detachable component 40 is very far from the COM when the watercraft 20 is capsized. The round surface of the detachable buoyant component creates an unstable equilibrium causing the entire watercraft to rock with the slightest perturbation. The long lever arm between the opposing buoyant force and weight of the watercraft creates a strong moment that flips the watercraft back over into the stable upright position shown in FIG. 7A.

Various alternative embodiments of the detachable component 40 are possible. For example, the detachable component 40 can be applied to watercraft of many different sizes and configurations. In addition, the detachable component 40 can be applied to aquatic structures other than watercraft. The following describes various other alternative embodiments.

Figure 8:
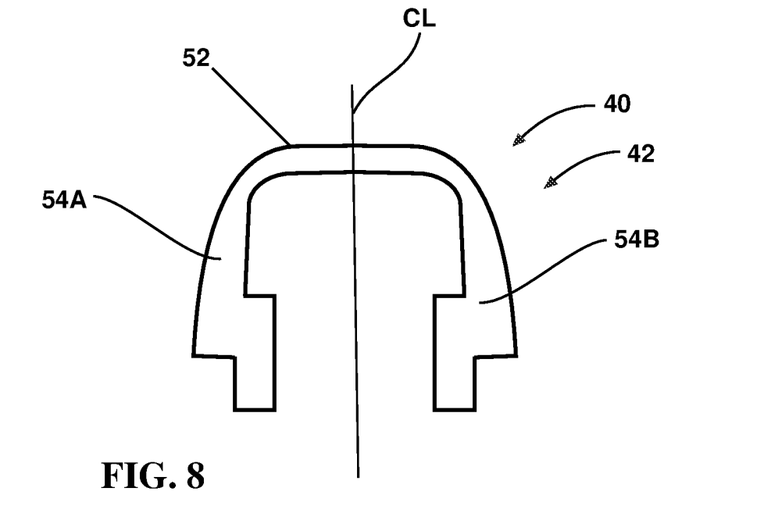
FIG. 8 is a schematic front view of a buoyant component that has an asymmetric configuration to guide the self-righting action in a certain roll direction.

In some cases, it may be desirable for the self-righting action to happen in a specific direction. This can be useful in watercraft that require (or prefer) a specific rotational direction to bring them upright. For instance, some jet-drive PWCs recommend that the dismounted pilot roll the watercraft back upright in a specific direction in order to prevent water from entering the engine through the exhaust pipe. FIG. 8 shows one way to guide the self-righting action in a desired roll-direction is to make the detachable component asymmetric about its longitudinal centerline CL so that more buoyant material is located on one side 54B of the longitudinal centerline than the other side 54A.

Figure 9:
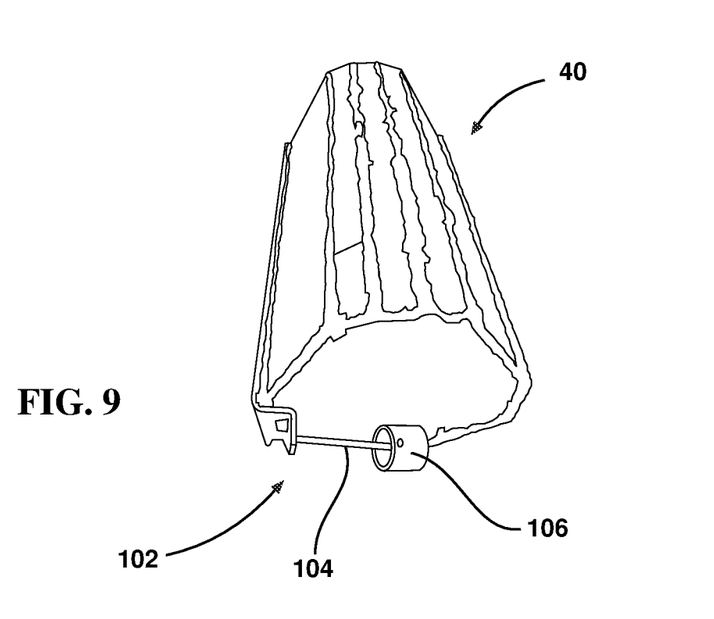
FIG. 9 is a perspective view of a model of a buoyant component that has a slidable weight system joined thereto to guide the self-righting action in a certain roll direction.

FIG. 9 shows that a sliding weight system 102 can be provided on the detachable component 40 in order to cause the self-righting action to happen in a specific direction. The sliding weight system 102 comprises a member such as a bar 104 along which at least one weight 106 is movable when the watercraft flips over. Hence, slidable weights could be included (if needed) to guide the self-righting action in the proper roll-direction.

The embodiment shown in FIGS. 1 and 2 does not require that its self-righting action occur in a particular direction because a flapper valve is installed in the exhaust pipe of the personal watercraft 20 to prevent flooding of the engine. The flapper valve introduces some tradeoffs in performance of the engine, but such tradeoffs are necessary and justified in order to create a more robust and reliable rescue vehicle. Hence the flapper-equipped vehicle can be self-righted in any direction. This configuration is preferred for autonomous rescue vehicles since a pilot will not be onboard to right the vehicle according to any specific direction or protocols.

Figure 10:
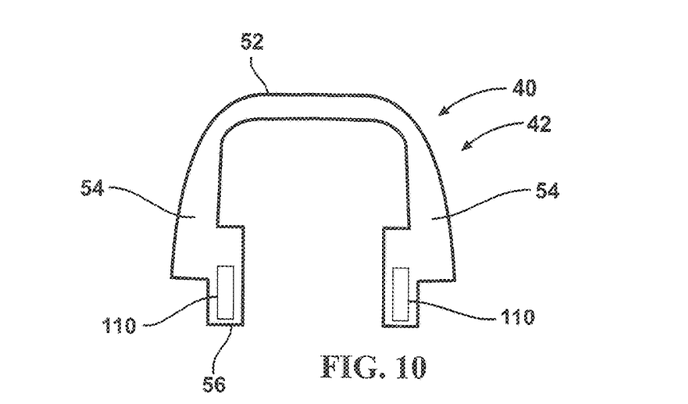
FIG. 10 is a schematic cross-sectional view of a buoyant component that has internal compartments for fuel or supplies.

FIG. 10 shows that the detachable component 40 can also be configured with at least one internal compartment to carry supplies or an auxiliary fuel load for the underlying personal watercraft. Depending upon the mission parameters of the vehicle, the existing fuel load in the standard tanks might not be enough. The mission distance can be extended, and even doubled, with a reasonable volume of fuel being loaded into a compartment (fuel cell) inside of the detachable component. Since fuel is generally heavy, the fuel cell should be located on the lower part of the detachable component in order to keep the center of buoyancy (COB) high enough above the vehicle's collective center of mass (COM). If the COB is sufficiently high, then the detachable component will still produce a high enough moment arm around the COM (i.e., on an inverted vehicle) to bring the vehicle back to an upright position.

Figure 11:
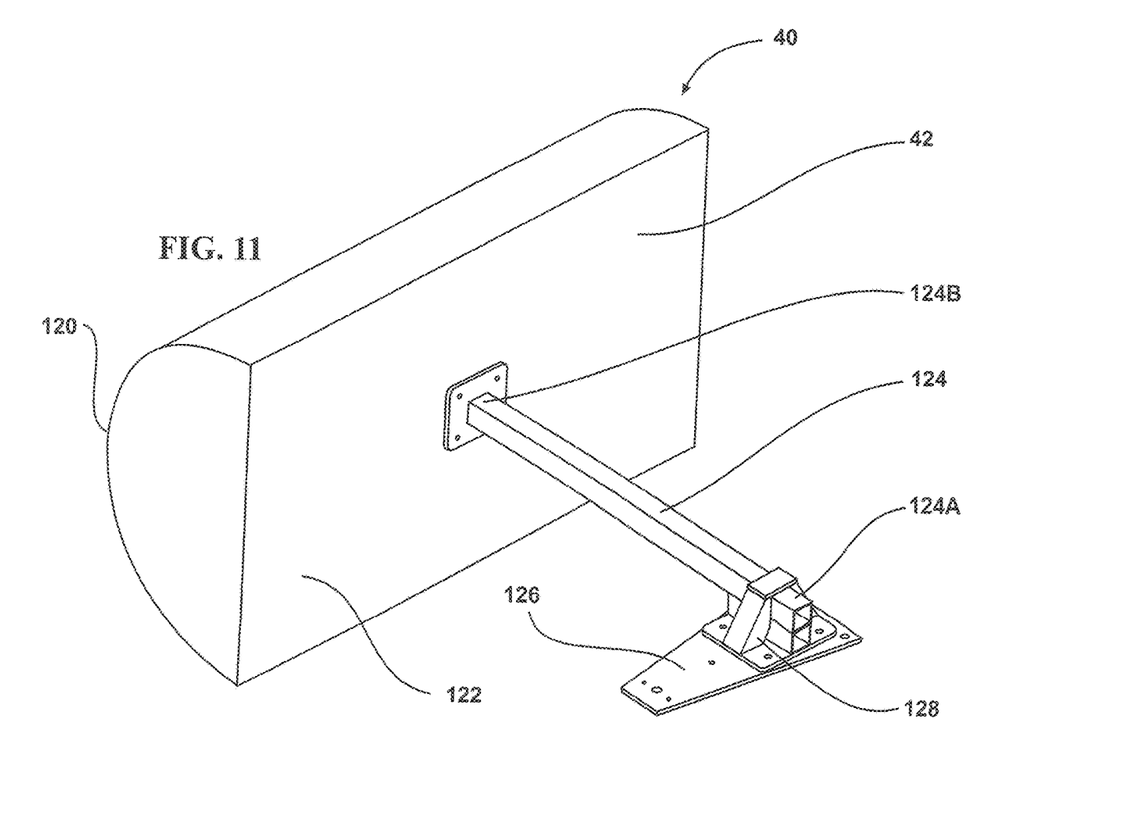
FIG. 11 is a perspective view of alternative embodiment of a detachable buoyant component for making a watercraft self-righting.
Figure 12:
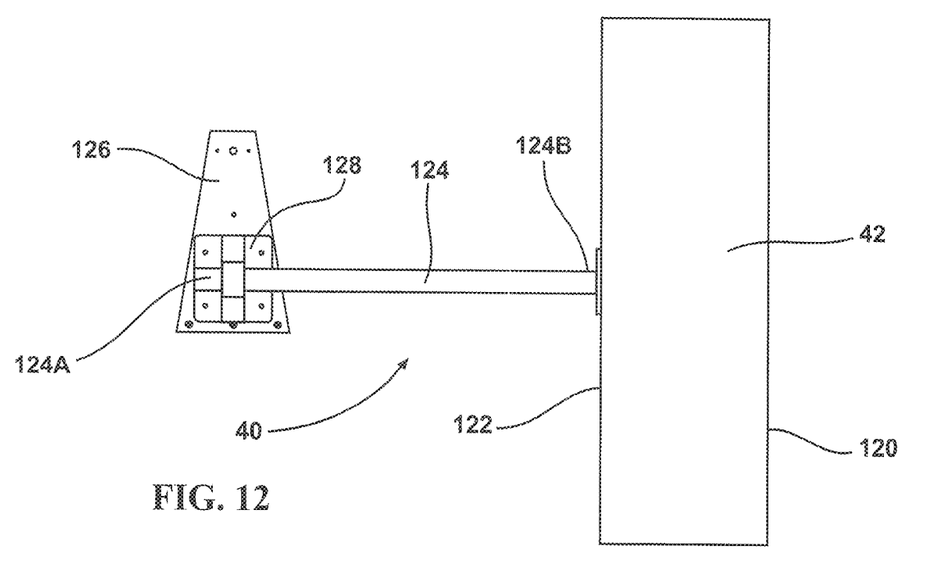
FIG. 12 is a top view of the detachable buoyant component shown in FIG. 11.
Figure 13:
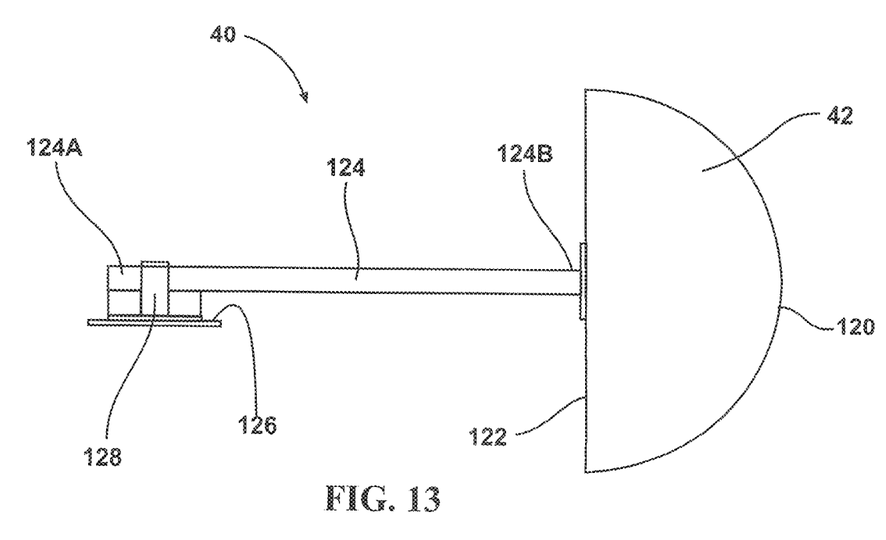
FIG. 13 is a rear view of the detachable buoyant component shown in FIG. 11.

FIGS. 11-13 show alternative embodiment of a detachable buoyant component for making a watercraft self-righting. In this embodiment, a non-inflatable buoyant element 42 is provided which is designed to be positioned outboard of one side (port or starboard) of the watercraft. The buoyant element 42 can comprise at least one of: (a) a buoyant material and (b) materials that are arranged into a buoyant configuration The buoyant element 42 can have any suitable configuration that promotes the self-righting of the watercraft. In the embodiment shown, the buoyant element 42 is in the configuration of a half cylinder (a cylinder that has been divided longitudinally). The outermost surface 120 of the buoyant element 42 is convex and barrel-shaped, and the inner surface 122 is planar.

An arm 124 is joined to the buoyant element 42 for spacing the buoyant element 42 away from one side of the watercraft. The arm 124 has a proximal end 124A that is joined to a watercraft and a distal end 124B that is joined to the buoyant element 42. The arm 124 may be of any length suitable for positioning the buoyant element 42 at least partially outboard of the watercraft. In the embodiment shown, the arm 124 has a length that is greater than the width of the watercraft. The proximal end 124A of the arm 124 may be detachably joined to any suitable portion of the watercraft. In the embodiment shown, the proximal end 124A of the arm is indirectly joined a portion of the seats of a multi-person seat of a personal watercraft. In this case, the back seat of a three seat personal watercraft is removed and replaced with a plate 126 that is joined to the watercraft such as by bolts. A bracket 128 is joined to the plate 126 to detachably connect the proximal end 124A of the arm 124 to the watercraft via the plate 126 and hold the buoyant element 42 at least partially outboard of one side of the watercraft. The bracket 128 can have connection mechanisms with quick release features as described previously for removably connecting the bracket 128 to the plate 126. The connection mechanisms can be oriented to allow the arm 124 and buoyant element 42 to be removed in various directions including to the front, rear, or to the side. In this case, a person rescued by an autonomous watercraft would be able to sit on the main front seat or the other seat which is not replaced by the plate 126.

The autonomous rescue vehicle may be used by deploying the vehicle onto the body of water in the general location of a person isolated on a body of water. The rescue vehicle may be deployed from a larger watercraft, an airplane, or from land. If the rescue vehicle is deployed from an airplane, it will typically be air dropped with a parachute that is attached to the rescue vehicle. The parachute can be configured to release from the rescue vehicle once it lands on the surface of the water.

The rescue vehicle may then autonomously navigate to specified GPS waypoints using the autonomous control system so that it is brought in the area of the person to be rescued. The rescue vehicle can then use signals gathered from the search devices such as the radio direction finder and the infrared sensor (or camera) to narrow the search for the person to be rescued. The rescue vehicle may be optionally remotely piloted by an operator at another location, particularly when it is in the immediate vicinity of the person to be rescued to avoid running into the person to be rescued. The operator may be on a ship, in an airplane, or on land, and may use the camera to locate the person to be rescued.

The rescue vehicle is navigated to the location of the person to be rescued so that the person is within reach of the rescue vehicle. The person to be rescued is provided with the use of the rescue vehicle to return to safety with the option of detaching the detachable component from the watercraft, or using the watercraft with the detachable component joined thereto.

If the detachable component is removed from the watercraft, it can be used as a floatation and/or safety device. Depending upon its configuration, it could also be used as shelter for the person being rescued, particularly if inner foam portions can be readily removed to make room inside the detachable component for the person. Note also, that even if there is still fuel in the fuel cell when the personal watercraft reaches a person, this should not adversely affect the buoyance of the detachable component, and the fuel cell could be made to be removable and reusable. A pouring spout or hose can also be provided with the fuel cell. Upon removal of the detachable component, the seating area of the personal watercraft is made more accessible and a rescued person can ride the personal watercraft back to safety.

The personal watercraft may then be controlled autonomously (e.g., by autopilot) to guide the watercraft back to safety, or it may be controlled manually and navigated back to safety such as by GPS waypoint navigation.

The autonomous rescue vehicle described herein can provide a number of advantages. It should be understood, however, that these advantages need not be required unless they are set forth in the appended claims. The autonomous rescue vehicles can locate, assist, and retrieve a person in need of rescue without placing rescuers in danger. The rescue vehicle may be provided with a self-righting mechanism if the vehicle flips over. In addition, the autonomous rescue vehicle is practical and can be built on a commercially available watercraft using off-the-shelf components.

The terms "connected" and "joined", as used herein, encompass configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element. The terms "connected" and "joined" include both those configurations in which an element is temporarily joined to another element, or in which an element is permanently joined to another element.

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

It should be understood that every maximum numerical limitation given throughout this specification includes every lower numerical limitation, as if such lower numerical limitations were expressly written herein. Every minimum numerical limitation given throughout this specification includes every higher numerical limitation, as if such higher numerical limitations were expressly written herein. Every numerical range given throughout this specification includes every narrower numerical range that falls within such broader numerical range, as if such narrower numerical ranges were all expressly written herein.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. An autonomous aquatic rescue vehicle comprising:
   a) a watercraft comprising a vessel body with a motor, a propulsion mechanism that is operatively connected to the motor, and a steering mechanism joined to said vessel body, wherein said watercraft comprises at least one seat for a person to ride in or on said watercraft;
   b) a speed control joined to said watercraft and in communication with said motor;
   c) a directional control joined to said watercraft and in communication with said steering mechanism;
   d) an autonomous control system on board said watercraft and in operative communication with said directional and speed controls;
   e) a search device joined to said watercraft; and
   f) a detachable component joined to said watercraft for automatically self-righting the watercraft if the watercraft is tipped over, said detachable component comprising:
      a non-inflatable buoyant structure that comprises at least one of: (1) a buoyant material and (2) materials that are arranged into a buoyant configuration; and
      at least one connecting mechanism joined to said buoyant structure that is configured to detachably connect the buoyant structure to the watercraft.

2. The aquatic rescue vehicle of claim 1 wherein said watercraft is a personal watercraft that comprises a hull and a deck, wherein the motor is disposed between the hull and the deck, and the steering mechanism is in the form of handlebars and the speed control comprises a throttle on the handlebars.

3. The aquatic rescue vehicle of claim 1 wherein said search device comprises at least one of a radio direction finder and an infrared sensor.

4. The aquatic rescue vehicle of claim 1 wherein the watercraft comprises a hull and a deck, and the buoyant structure comprises an interior surface, an exterior surface, a front portion, a rear portion, a top portion, and sides extending at an angle from said top portion, wherein said sides have free end portions, wherein the sides are joined to the watercraft and the top portion of the buoyant structure is disposed vertically above and spaced away from the deck of the watercraft.

5. An autonomous aquatic rescue vehicle comprising:
  a) a watercraft comprising a vessel body with a motor, a propulsion mechanism that is operatively connected to the motor, and a steering mechanism joined to said vessel body, wherein said vessel body comprises a hull and a deck;
  b) a speed control joined to said watercraft and in communication with said motor;
  c) a directional control joined to said watercraft and in communication with said steering mechanism;
  d) an autonomous control system on board said watercraft and in operative communication with said directional and speed controls;
  e) a search device joined to said watercraft; and
  f) a detachable component joined to said watercraft for automatically self-righting the watercraft if the watercraft is tipped over, said detachable component comprising:
    a non-inflatable buoyant structure that comprises at least one of: (1) a buoyant material and (2) materials that are arranged into a buoyant configuration, wherein the buoyant structure comprises an interior surface, an exterior surface, a front portion, a rear portion, a top portion, and sides extending at an angle from said top portion, wherein said sides have free end portions, wherein the sides are joined to the watercraft and the top portion of the buoyant structure is disposed vertically above and spaced away from the deck of the watercraft, and said buoyant structure has a tunnel-shaped configuration and the top portion of the buoyant structure is spaced a sufficient distance away from the deck of the watercraft so that a person can fit under the tunnel-shaped buoyant structure; and
    at least one connecting mechanism joined to said buoyant structure that is configured to detachably connect the buoyant structure to the watercraft.

6. A method of rescuing a person on a body of water, said method comprising the steps of:
  1) Providing an autonomous aquatic rescue vehicle comprising:
    a) a watercraft comprising a vessel body with a motor, a propulsion mechanism that is operatively connected to the motor, and a steering mechanism joined to said vessel body, wherein said watercraft comprises at least one seat for a person to ride in or on said watercraft;
    b) a speed control joined to said watercraft and in communication with said motor;
    c) a directional control joined to said watercraft and in communication with said steering mechanism;
    d) an autonomous control system on board said watercraft and in operative communication with said directional and speed controls;
    e) a search device joined to said watercraft, wherein the search device is configured to gather signals relating to the location of a person or object that is the subject of a search; and
    f) a detachable component joined to said watercraft for self-righting the watercraft if the watercraft is tipped over, said detachable component comprising:
      a non-inflatable buoyant structure that comprises at least one of: (i) a buoyant material and (ii) materials that are arranged into a buoyant configuration; and
      at least one connecting mechanism joined to said buoyant structure that is configured to detachably connect the buoyant structure to the watercraft;
  2) deploying the autonomous rescue vehicle onto the body of water in the general location of a person isolated on a body of water;
  3) allowing the vehicle to autonomously navigate to a designated waypoint near the isolated person using said autonomous control system;
  4) Receiving signals from the search device to locate the isolated person;
  5) navigating the autonomous rescue vehicle to the location of the isolated person so that the isolated person is within reach of the rescue vehicle; and
  6) Providing the isolated person with the use of the autonomous rescue vehicle to return to safety with the option of detaching the detachable component from the watercraft, or using the watercraft with the detachable component joined thereto.

7. The method of claim 6 wherein the watercraft is a personal watercraft that comprises a hull and a deck, wherein the motor is disposed between the hull and the deck, and the steering mechanism is in the form of handlebars and the speed control comprises a throttle on the handlebars.

8. The method of claim 6 wherein the watercraft comprises a hull and a deck, and the buoyant structure comprises an interior surface, an exterior surface, a front portion, a rear portion, a top portion, and sides extending at an angle from said top portion, wherein said sides have free end portions, wherein the sides are joined to the watercraft and the top portion of the buoyant structure is disposed vertically above and spaced away from the deck of the watercraft.

9. A method of rescuing a person on a body of water, said method comprising the steps of:
  1) Providing an autonomous aquatic rescue vehicle comprising:
    a) a watercraft comprising a vessel body with a motor, a propulsion mechanism that is operatively connected to the motor, and a steering mechanism joined to said vessel body;
    b) a speed control joined to said watercraft and in communication with said motor;
    c) a directional control joined to said watercraft and in communication with said steering mechanism;
    d) an autonomous control system on board said watercraft and in operative communication with said directional and speed controls;
    e) a search device joined to said watercraft, wherein the search device is configured to gather signals relating to the location of a person or object that is the subject of a search; and f) a detachable component joined to said watercraft for self-righting the watercraft if the watercraft is tipped over, said detachable component comprising:
a non-inflatable buoyant structure that comprises at least one of: (i) a buoyant material and (ii) materials that are arranged into a buoyant configuration, wherein the buoyant structure comprises an interior surface, an exterior surface, a front portion, a rear portion, a top portion, and sides extending at an angle from said top portion, wherein said sides have free end portions, wherein the sides are joined to the watercraft and the top portion of the buoyant structure is disposed vertically above and spaced away from the deck of the watercraft, and said buoyant structure has a tunnel-shaped configuration and the top portion of the buoyant structure is spaced a sufficient distance away from the deck of the watercraft so that a person can fit under the tunnel-shaped buoyant structure; and
at least one connecting mechanism joined to said buoyant structure that is configured to detachably connect the buoyant structure to the watercraft;
2) deploying the autonomous rescue vehicle onto the body of water in the general location of a person isolated on a body of water;
3) allowing the vehicle to autonomously navigate to a designated waypoint near the isolated person using said autonomous control system;
4) receiving signals from the search device to locate the isolated person;
5) navigating the autonomous rescue vehicle to the location of the isolated person so that the isolated person is within reach of the rescue vehicle; and
6) providing the isolated person with the use of the autonomous rescue vehicle to return to safety with the option of detaching the detachable component from the watercraft, or using the watercraft with the detachable component joined thereto.

10. The method of claim 9 wherein the front portion of said buoyant structure is open and the rear portion of said buoyant structure comprises a rear wall that extends at an angle from the top portion as do the sides, and the rear wall is joined to the sides of said buoyant structure at said rear portion.

11. The method of claim 10 wherein the connecting mechanism comprises a first group of fastening components that are joined to the watercraft and a second group of fastening components that are joined to the buoyant structure, wherein the fastening components in the first group mate with the fastening components in the second group, and at least some of the fastening components in the first and second groups are joined to each other with releasable securing components.

12. The method of claim 11 wherein the rear wall of the buoyant structure has a handle joined to the outside surface of said rear wall, and the method further comprises detaching the detachable component from the watercraft by disengaging the releasable securing components and removing the detachable component from the watercraft with one hand using the handle on the rear wall of the buoyant structure.

13. The method of claim 6 further comprising a step of autonomously returning the person to a specified location on said vehicle.

14. A method of rescuing a person on a body of water, said method comprising the steps of:
1) Providing an autonomous aquatic rescue vehicle comprising:
a) a watercraft comprising a vessel body with a motor, a propulsion mechanism that is operatively connected to the motor, and a steering mechanism joined to said vessel body;
b) a speed control joined to said watercraft and in communication with said motor;
c) a directional control joined to said watercraft and in communication with said steering mechanism;
d) an autonomous control system on board said watercraft and in operative communication with said directional and speed controls;
e) a search device joined to said watercraft, wherein the search device is configured to gather signals relating to the location of a person or object that is the subject of a search; and
f) a detachable component joined to said watercraft for self-righting the watercraft if the watercraft is tipped over, said detachable component comprising:
a non-inflatable buoyant structure that comprises at least one of: (i) a buoyant material and (ii) materials that are arranged into a buoyant configuration; and
at least one connecting mechanism joined to said buoyant structure that is configured to detachably connect the buoyant structure to the watercraft;
2) deploying the autonomous rescue vehicle onto the body of water in the general location of a person isolated on a body of water;
3) allowing the vehicle to autonomously navigate to a designated waypoint near the isolated person using said autonomous control system;
4) receiving signals from the search device to locate the isolated person;
5) navigating the autonomous rescue vehicle to the location of the isolated person so that the isolated person is within reach of the rescue vehicle;
6) providing the isolated person with the use of the autonomous rescue vehicle to return to safety with the option of detaching the detachable component from the watercraft, or using the watercraft with the detachable component joined thereto; and
7) permitting the rescued person to manually pilot the rescue vehicle to a safe location.

* * * * *